United States Patent
Ueda et al.

(10) Patent No.: US 8,868,904 B2
(45) Date of Patent: Oct. 21, 2014

(54) INFORMATION PROCESSING DEVICE, DISC, INFORMATION PROCESSING METHOD, AND PROGRAM

(75) Inventors: Kenjiro Ueda, Tokyo (JP); Tateo Oishi, Tokyo (JP); Katsumi Muramatsu, Tokyo (JP); Motoki Kato, Tokyo (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 12/747,100

(22) PCT Filed: Jan. 20, 2009

(86) PCT No.: PCT/JP2009/050750
§ 371 (c)(1),
(2), (4) Date: Jun. 9, 2010

(87) PCT Pub. No.: WO2009/093571
PCT Pub. Date: Jul. 30, 2009

(65) Prior Publication Data
US 2010/0268944 A1    Oct. 21, 2010

(30) Foreign Application Priority Data

Jan. 21, 2008 (JP) ................................. 2008-010187
Jan. 21, 2008 (JP) ................................. 2008-010188

(51) Int. Cl.
| H04L 9/32 | (2006.01) |
| H04L 9/08 | (2006.01) |
| G11B 20/00 | (2006.01) |
| G06F 21/62 | (2013.01) |

(52) U.S. Cl.
CPC ...... *G11B 20/0021* (2013.01); *G11B 20/00427* (2013.01); *G06F 21/6209* (2013.01);
(Continued)

(58) Field of Classification Search
CPC .... H04L 9/321; H04L 9/3297; G06F 21/6209
USPC ......................................................... 713/157
See application file for complete search history.

(56) References Cited

U.S. PATENT DOCUMENTS 6,766,353 B1    7/2004  Lin et al.
2004/0117620 A1*  6/2004  Rothrock ...................... 713/164
(Continued)

FOREIGN PATENT DOCUMENTS

| EP | 1 791 121 A2 | 5/2007 |
| JP | 2003 115840 | 4/2003 |

(Continued)

OTHER PUBLICATIONS

Japanese Office Action issued Aug. 30, 2011, in Patent Application No. 2008-010187.
(Continued)

*Primary Examiner* — Andrew Goldberg
*Assistant Examiner* — Gary Gracia
(74) *Attorney, Agent, or Firm* — Oblon, Spivak, McClelland, Maier & Neustadt, L.L.P.

(57) ABSTRACT

A configuration is provided wherein usage restrictions of an application are determined in accordance with timestamps. A certificate revocation list (CRL) in which the revocation information of a content owner who is a providing entity of an application program recorded in a disc is recorded is referred to verify whether or not a content owner identifier recorded in an application certificate is included in the CRL, and in the case that the content owner identifier is included in the CRL, comparison between a timestamp stored in a content certificate and a CRL timestamp is executed, and in the case that the content certificate timestamp has date data equal to or later than the CRL timestamp, utilization processing of the application program is prohibited or restricted. According to the present configuration, a configuration is realized wherein an unrevoked application is not subjected to utilization restriction, and only a revoked application is subjected to utilization restriction.

17 Claims, 9 Drawing Sheets

(52) U.S. Cl.
CPC .......... *H04L 2209/60* (2013.01); *H04L 9/3297* (2013.01); *H04L 9/321* (2013.01); *G11B 20/00086* (2013.01); *H04L 9/3268* (2013.01)
USPC .......... 713/157; 713/158; 713/176; 713/187; 713/189; 713/193

(56) References Cited

U.S. PATENT DOCUMENTS

| | | | |
|---|---|---|---|
| 2004/0243814 A1* | 12/2004 | Nakano et al. | 713/189 |
| 2005/0066167 A1* | 3/2005 | Asano et al. | 713/165 |
| 2005/0138401 A1* | 6/2005 | Terao et al. | 713/189 |
| 2006/0095383 A1* | 5/2006 | Chase et al. | 705/59 |
| 2006/0168357 A1* | 7/2006 | Nakano et al. | 710/5 |
| 2006/0269222 A1* | 11/2006 | Horii | 386/83 |
| 2006/0274612 A1* | 12/2006 | Kim | 369/30.04 |
| 2007/0133944 A1 | 6/2007 | Takashima et al. | |
| 2007/0136282 A1* | 6/2007 | Takashima | 707/6 |
| 2007/0171485 A1* | 7/2007 | Yachida | 358/474 |
| 2007/0204078 A1* | 8/2007 | Boccon-Gibod et al. | 710/54 |
| 2008/0010452 A1* | 1/2008 | Holtzman et al. | 713/158 |
| 2008/0022131 A1* | 1/2008 | Ueda et al. | 713/193 |
| 2008/0034440 A1* | 2/2008 | Holtzman et al. | 726/27 |
| 2008/0098232 A1* | 4/2008 | Miyazaki et al. | 713/176 |
| 2008/0134340 A1* | 6/2008 | Ueda et al. | 726/26 |
| 2009/0183262 A1 | 7/2009 | Ueda et al. | |
| 2009/0204825 A1 | 8/2009 | Takashima | |
| 2009/0222674 A1* | 9/2009 | Leichsenring et al. | 713/193 |

FOREIGN PATENT DOCUMENTS

| | | |
|---|---|---|
| JP | 2005-124097 | 5/2005 |
| JP | 2005 328198 | 11/2005 |
| JP | 2005-328198 | 11/2005 |
| JP | 2006 50355 | 2/2006 |
| JP | 2006-221629 | 8/2006 |
| JP | 2007-128366 | 5/2007 |
| JP | 2007-150587 | 6/2007 |
| JP | 2007 157308 | 6/2007 |
| WO | WO 2006/073252 A2 | 7/2006 |
| WO | 2006 085647 | 8/2006 |

OTHER PUBLICATIONS

Japanese Office Action issued Aug. 30, 2011, in Patent Application No. 2008-010188.

European Search Report issued Dec. 1, 2011, in Patent Application No. 09703470.6.

"Advanced Access Content System (AACS), Blu-ray Disc Pre-recorded Book", Intel Corporation, http://www.aacsla.com/specifications/AACS_Spec_BD_Prerecorded_0.92.pdf, XP 55012339, Dec. 5, 2007, 114 pages.

"Advanced Access Content System (AACS), Pre-recorded Video Book", Intel Corporation, http://www.aacsla.com/specifications/AACS_Spec_Prerecorded_0.92.pdf, XP 7911576, Nov. 29, 2007, 61 pages.

\* cited by examiner

INFORMATION PROCESSING DEVICE, DISC, INFORMATION PROCESSING METHOD, AND PROGRAM

TECHNICAL FIELD

The present invention relates to an information processing device, a disc, an information processing method, and a program, and further specifically relates to an information processing device, a disc, an information processing method, and a program, which perform readout control and utilization control of a content and identification information (ID) recorded in an information recording medium.

BACKGROUND ART

Discs such as DVD (Digital Versatile Disc), Blu-ray Disc (registered trademark), and the like have been employed as content recoding media. For example, a movie content or the like is recorded in a disc (e.g., ROM disc) and provided to a user, but such a disc-recorded content is often a content of which the copyright and distribution right and the like are possessed by a producer or seller thereof. With regard to such a content, for example, utilization control for preventing unauthorized copy and the like is performed.

There are various modes as a utilization control mode, but under the stipulations of AACS (Advanced Access Content System) which stipulates copyright protection art, for example, an arrangement is made wherein, in order to use a disc-recorded content, ID information such as an media ID or the like is read out from a disc, confirmation of the read ID, key generation using the ID information, or the like is executed, and accordingly, content utilization control is performed.

For example, identification information (ID) such as the following is recorded in a disc. Identification information (IDs) of (a) Media ID (also referred to as PMSN (Pre-recorded Media Serial Number)) that is disc-specific identification information, (b) Volume ID set in increments of disc titles, and (c) Content certificate ID serving as the identification information of a content certificate set in a manner correlated with a disc-recorded content is recorded in a disc, for example.

A player reads out, for example, at least one of the above (a) through (c) identification information (IDs) from a disc, and performs content utilization by processing conforming to a predetermined sequence, e.g., key generation or content decoding using the ID, or the like. Further, there is a case where the player transmits the above each type of the identification information (IDs) to a server, and receives various additional contents and service data and the like from the server based on ID confirmation at the server.

Note that, instead of the above (a) through (c) recorded in the disc, (d) Device binding ID that is player associated identification information may be used. The device binding ID is recorded in memory within the player as player-specific identification information, and at the time of using a disc-stored content, obtaining the subsequent data from the server, using the subsequent data stored in a storage unit such as a hard disk of the player, or the like, the device binding ID is used at processing, for example, ID confirmation serving as the confirmation processing of the player, key generation, content decoding, and the like.

In order to perform content playback or copy processing by reading out the above (a) through (d) identification information (IDs), or data obtaining processing from the server, or the like, a predetermined program has to be executed at the player. The program is often a program created in a manner correlated with a disc-stored content, and is recorded in a disc along with the content, and the player reads out the program from the disc to execute this.

Such a program is created as a simple program in which Java (registered trademark) is employed for example, often created by, for example, a content possessor or provider (content owner), or commissioned thereby, and accordingly, an unauthorized program may be mixed therein.

An unauthorized program may be used at unauthorized processing, such as obtaining identification information (ID) recorded in a disc in an unauthorized manner to use the content thereof, obtaining of service data from a server in an unauthorized manner, or the like.

Description will be made regarding the outline of a content utilization control configuration according to the current AACS rule, with reference to FIG. 1. FIG. 1 illustrates a disc (medium) 120 in which a content 121 is stored, a content owner 110 who provides a disc-recorded content, and a license management department 130 configured to perform content management processing. The license management department 130 is managed, for example, by an AACS LA (Licensing Administrator) who performs content utilization management following the AACS rule.

Identification information (IDs) 122 described above is recorded in the disc 120 as well as the content 121. As the identification information (IDs) 122, ID information of (a) Media ID (PMSN) 126 that is disc-specific identification information, (b) Volume ID 127 set in increments of disc titles, and (c) Content certificate ID 128 serving as the identification information of a content certificate set in a manner correlated with a disc-recorded content, is included.

A content certificate 123 for proving that the content 121 is an authorized content, i.e., an authorized content certified by the license management department (AACS LA) 130 is recorded in the disc 120. The content certificate 123 is issued under the management of the license management department 130 as data, corresponding to the content 121 recorded in the disc 120, for certifying validity thereof, and is recorded in the disc 120.

The content certificate 123 has a configuration, such as shown in the details thereof within the license management department 130, wherein root certificate hash values are recorded, an electronic signature by the secret key of the license management department (AACS LA) 130 is provided to these recorded hash values. A root certificate 124 is recorded in the disc 120, and has a configuration, such as shown in the content owner 110 of the drawing, wherein a signature is set to the public key of the content owner by the secret key of the content owner.

The player which plays the content 121 recorded in the disc executes verification of the signature set to the content certificate, and permits use of the content 121 on condition that the validity of the content certificate is confirmed. Thus, confirmation of validity is rigorously executed regarding contents.

However, a disc-recorded application 125 may further be recorded in the disc 120. This disc-recorded application 125 is a program, for example, used for playback processing of the content 121, and other processing. Specifically, examples of this program include an application for providing service data to a content utilizing user from a server or the like, and a program to be executed for obtaining service data from a server by transmitting the identification information (IDs) 122 recorded in the disc 120 to the server or the like.

This disc-recorded application 125 has a configuration, such as shown in the content owner 110 in the drawing, wherein a signature is set to an application provided by the content owner using the secret key of the content owner.

The player employing the disc-recorded application 125 recorded in the disc 120 confirms the validity of the application by performing verification of the signature set to the disc-recorded application 125 using the public key of the content owner, thereby executing the application.

However, this disc-recorded application 125 may independently be created by the content owner 110, and surveillance by a third party is not made. As described above, the validity of a content can be confirmed by the content certificate 123 to be issued by the license management department 130 corresponding to the content thereof, but the disc-recorded application 125 is data of which the validity is not readily confirmed by a third party, and accordingly, a possibility is undeniable wherein the content owner 110 may create an unauthorized application.

As described above, employing an unauthorized application may cause the identification information (IDs) 122 recorded in the disc 120 to be obtained in an unauthorized manner and used in unauthorized processing such as using the content 121 in an unauthorized manner, or obtaining service data from a server in an unauthorized manner.

DISCLOSURE OF INVENTION

Technical Problem

The present invention has been made in light of the above problems, and has an object for providing an information processing device, a disc, an information processing method, and a program, which prevent unauthorized readout and utilization of a content and identification information recorded in a disc.

Technical Solution

A first aspect of the present invention is
an information processing device configured to perform utilization control of an application program recorded in a disc, characterized by including:
an application executing unit configured to execute processing utilizing the application program;
a data verifying unit configured to read out an application certificate in which the public key of a content owner serving as a provider of the application program is stored, and the signature of a certificate authority that is a third party is set, from a disc to execute first signature verification, and further to read out root certificate associated data including a signature as to data including a root certificate recorded in a disc as a certificate corresponding to the application program, from a disc, and apply the content owner's public key thereto to execute second signature verification; and
an application control unit configured to prohibit or restrict application program utilization processing at the application executing unit, in the case that verification fails at first and second signature verification processing at the data verifying unit.

Further, an embodiment of the information processing device according to the present invention is characterized in that the data verifying unit refers to a certificate revocation list (CRL) in which the revocation information of a content owner who is a providing entity of the application program is recorded to verify whether or not a content owner identifier recorded in an application certificate recorded in a disc serving as a certificate corresponding to the application program is included in the certificate revocation list (CRL), and in the case that the content owner identifier is included, obtains a content certificate timestamp stored in a content certificate recorded in a disc as a certificate corresponding to a recorded content of the disc, and a CRL timestamp stored in the certificate revocation list (CRL) to execute comparison of both timestamps, and in that the application control unit prohibits or restricts application program utilization processing at the application executing unit, in the case that the content certificate timestamp has date data equal to or later than the CRL timestamp.

Further, an embodiment of the information processing device according to the present invention is characterized in that the content certificate timestamp is date information corresponding to a signature generated date by a content certificate issuing entity, and in that the CRL timestamp is the expiry date of the application certificate, i.e., date information corresponding to the revocation date of a content owner recorded in the application certificate.

Further, an embodiment of the information processing device according to the present invention is characterized in that the application control unit executes processing for prohibiting processing for the application executing unit obtaining identification information recorded in a disc or information processing device.

Further, an embodiment of the information processing device according to the present invention is characterized in that the identification information is one of identification information (a) through (d) which are:
(a) Media ID (PMSN) that is disc-specific identification information,
(b) Volume ID to be set in increments of disc titles,
(c) Content certificate ID serving as the identification information of a content certificate set corresponding to a disc recorded content, and
(d) Device binding ID that is the identification information of an information processing device.

Further, an embodiment of the information processing device according to the present invention is characterized in that the application control unit executes processing for prohibiting or restricting processing for the application executing unit executing playback, copy, or external output of a content recorded in a disc.

Further, an embodiment of the information processing device according to the present invention is characterized in that the application control unit executes processing for prohibiting or restricting processing for the application executing unit connecting to an external server via a network.

Further, an embodiment of the information processing device according to the present invention is characterized in that the application control unit executes processing for prohibiting or restricting processing for the application executing unit executing API call-up processing as to a program executing unit configured to perform reading or utilization processing of disc recorded data.

Further, a second aspect of the present invention is
a disc in which is recorded:
a content;
a content certificate that is proof data corresponding to the content;
an application program;

an application certificate in which the public key of a content owner serving as a provider of the application program is stored, and the signature of a certificate authority that is a third party is set; and root certificate associated data including a signature as to data including a root certificate that is a certificate corresponding to the application program;

enabling a player which attempts to execute the application program to execute signature verification of the application program and the root certificate associated data, and to perform utilization control of the application program according to verification results.

Further, with an embodiment of the disc according to the present invention, the content certificate, which is a content certificate recording a timestamp corresponding to a signature generated date by a content certificate issuing entity, enables a player which attempts to execute the application program to perform, in the case that a content owner identifier recorded in the application certificate is included in a certificate revocation list (CRL) in which the revocation information of a content owner who is a providing entity of the application program is recorded, comparison between a content certificate timestamp stored in the content certificate, and a CRL timestamp stored in the certificate revocation list (CRL), and in the case that the content certificate timestamp has date data equal to or later than the CRL timestamp, to prohibit or restrict application program utilization processing.

Further, a third aspect of the present invention is an information processing method causing an information processing device to perform utilization control of an application program recorded in a disc at an information processing device, characterized by including:

a data verifying step for a data verifying unit reading out an application certificate in which the public key of a content owner serving as a provider of the application program is stored, and the signature of a certificate authority that is a third party is set, from a disc to execute first signature verification, and further reading out root certificate associated data including a signature as to data including a root certificate recorded in a disc as a certificate corresponding to the application program, from a disc, and applying the content owner's public key thereto to execute second signature verification; and an application control step for an application control unit prohibiting or restricting utilization processing of the application program, in the case that verification fails at first and second signature verification processing in the data verifying step.

Further, an embodiment of the information processing method according to the present invention is characterized by further including: a data verifying step for the data verifying unit referring to a certificate revocation list (CRL) in which the revocation information of a content owner who is a providing entity of the application program is recorded to verify whether or not a content owner identifier recorded in an application certificate recorded in a disc as a certificate corresponding to the application program is included in the certificate revocation list (CRL), and in the case that the content owner identifier is included, obtaining a content certificate timestamp stored in a content certificate recorded in a disc as a certificate corresponding to a recorded content of the disc, and a CRL timestamp stored in the certificate revocation list (CRL) to execute comparison of both timestamps; and an application control step for the application control unit prohibiting or restricting utilization processing of the application program, in the case that the content certificate timestamp has date data equal to or later than the CRL timestamp.

Further, an embodiment of the information processing method according to the present invention is characterized in that the content certificate timestamp is date information corresponding to a signature generated date by a content certificate issuing entity, and in that the CRL timestamp is the expiry date of the application certificate, i.e., date information corresponding to the revocation date of a content owner recorded in the application certificate.

Further, an embodiment of the information processing method according to the present invention is characterized in that the application control step executes processing for prohibiting processing for the application executing unit obtaining identification information recorded in a disc or information processing device.

Further, an embodiment of the information processing method according to the present invention is characterized in that the identification information is one of identification information (a) through (d) which are:

(a) Media ID (PMSN) that is disc-specific identification information, (b) Volume ID to be set in increments of disc titles, (c) Content certificate ID serving as the identification information of a content certificate set corresponding to a disc recorded content, and (d) Device binding ID that is the identification information of an information processing device.

Further, an embodiment of the information processing method according to the present invention is characterized in that the application control unit executes processing for prohibiting or restricting processing for the application executing unit executing playback, copy, or external output of a content recorded in a disc.

Further, an embodiment of the information processing method according to the present invention is characterized in that the application control step executes processing for prohibiting or restricting processing for the application executing unit connecting to an external server via a network.

Further, an embodiment of the information processing method according to the present invention is characterized in that the application control step executes processing for prohibiting or restricting processing for the application executing unit executing API call-up processing as to a program executing unit configured to perform reading or utilization processing of disc recorded data.

Further, a fourth aspect of the present invention is a program causing an information processing device to perform utilization control of an application program recorded in a disc, characterized by including:

a data verifying step for a data verifying unit reading out an application certificate in which the public key of a content owner serving as a provider of the application program is stored, and the signature of a certificate authority that is a third party is set, from a disc to execute first signature verification, and further reading out root certificate associated data including a signature as to data including a root certificate recorded in a disc as a certificate corresponding to the application program, from a disc, and applying the content owner's public key thereto to execute second signature verification; and an application control step for an application control unit prohibiting or restricting utilization processing of the application program, in the case that verification fails at first and second signature verification processing in the data verifying step.

Further, a fifth aspect of the present invention is a program causing an information processing device to perform utilization control of an application program recorded in a disc, characterized by including:

a data verifying step for the data verifying unit referring to a certificate revocation list (CRL) in which the revocation information of a content owner who is a providing entity of the application program is recorded to verify whether or not a content owner identifier recorded in an application certificate recorded in a disc serving as a certificate corresponding to the application program is included in the certificate revocation list (CRL), and in the case that the content owner identifier is included, obtaining a content certificate timestamp stored in a content certificate recorded in a disc as a certificate corresponding to a recorded content of the disc, and a CRL timestamp stored in the certificate revocation list (CRL) to execute comparison of both timestamps; and an application control step for the application control unit prohibiting or restricting utilization processing of the application program, in the case that the content certificate timestamp has date data equal to or later than the CRL timestamp.

Note that the program according to the present invention is, for example, a program that can be provided by a storage medium or communication medium to be provided in a computer-readable format as to a general-purpose system capable of executing various program codes. Providing such a program in a computer-readable format realizes processing according to the program on a computer system.

Further other objects, features, and advantages of the present invention will become apparent from more detailed description based on later-described embodiments of the present invention and attached drawings. Note that system as used in the present specification is a logical group configuration of multiple devices, and is not restricted to each component device being within the same housing.

Advantageous Effects

According to an embodiment of the present invention, a configuration is made wherein a certificate revocation list (CRL) in which the revocation information of a content owner who is a providing entity of an application program recorded in a disc is recorded is referred to verify whether or not a content owner identifier recorded in an application certificate is included in the certificate revocation list (CRL), and in the case that the content owner identifier is included in the CRL, comparison between a timestamp stored in a content certificate and a timestamp of the certificate revocation list (CRL) is executed, and in the case that the content certificate timestamp has date data equal to or later than the CRL timestamp, utilization processing of the application program at the application executing unit is prohibited or restricted. According to the present configuration, a configuration is realized wherein an unrevoked application is not subjected to utilization restriction, and only a revoked application is subjected to utilization restriction.

BEST MODE FOR CARRYING OUT THE INVENTION

Figure 1:
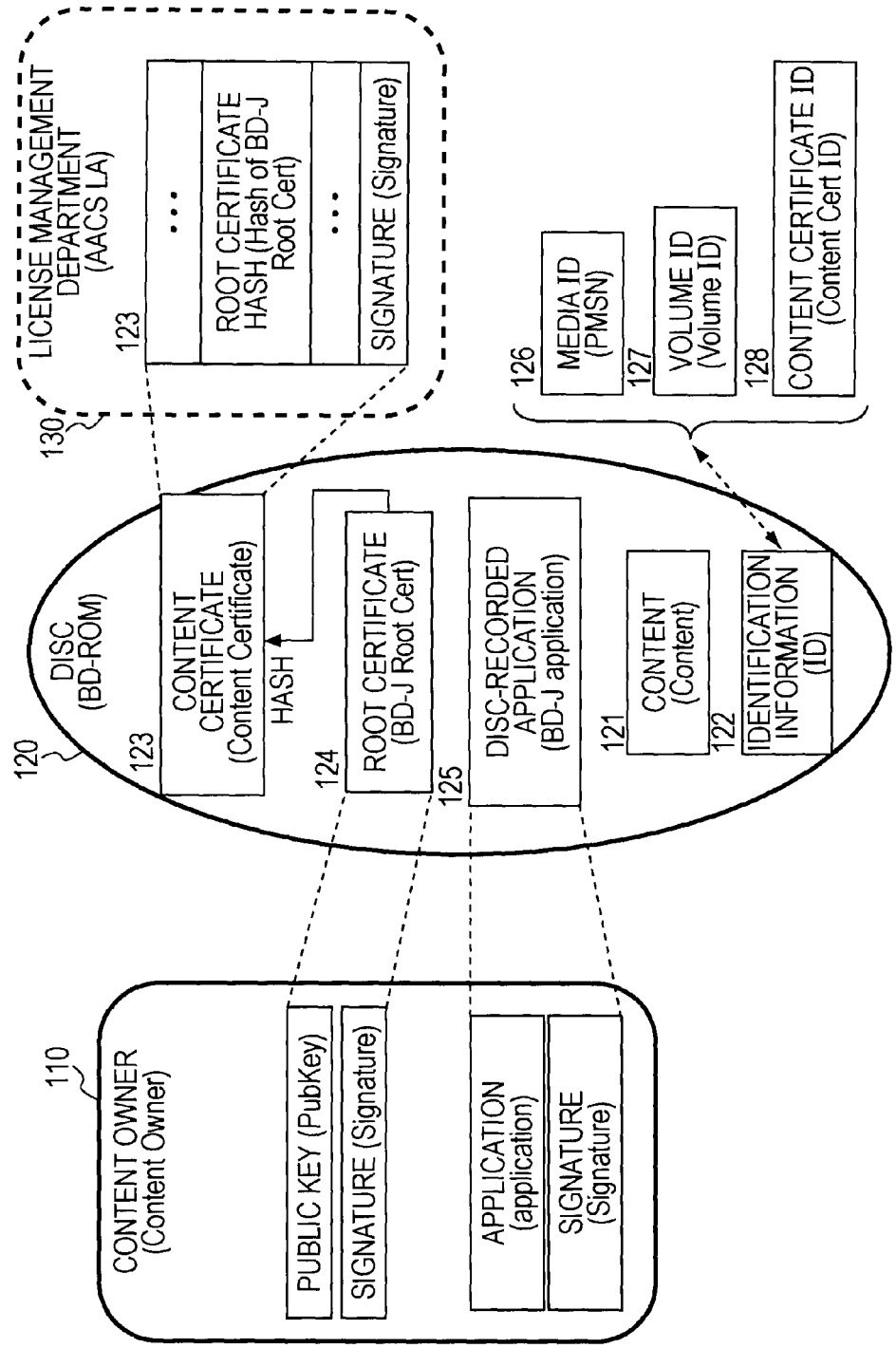
FIG. 1 is a diagram for describing the outline of content utilization control configuration according to the current AACS rule.

Description will be made below regarding the details of an information processing device, a disc, an information processing method, and a program according to the present invention, with reference to the drawings.

The outline of a configuration according to the present invention will be described with reference to FIG. 2. FIG. 2 illustrates, in the same way as described above with reference to FIG. 1, a disc (medium) 220 in which a content 221 is stored, a content owner 210 who provides a disc-recorded content, a license management department 230 for performing content management processing, and further newly illustrates a certificate authority (BDA-CA) 240. The license management department 230 is managed, for example, by an AACS LA (Licensing Administrator) who performs content utilization management conforming to the AACS rule.

Now, with the present embodiment, a BD (Blu-ray Disc (registered trademark)), and specifically a BD-ROM disc that is a ROM-type BD will be described as the disc 220. Note that, with the present embodiment, an example to which BD-ROM has been applied will be described, but a BD-ROM application example is an example, and the present embodiment may be applied to the other types of media.

Identification information (IDs) 222 is recorded, in the same way as described above with reference to FIG. 1, in the disc 220 as well as the content 221. As the identification information (IDs) 222, ID information of (a) Media ID (PMSN) 226 that is disc-specific identification information, (b) Volume ID 227 set in increments of disc titles, and (c) Content certificate ID 228 serving as the identification information of a content certificate set in a manner correlated with a disc-recorded content, is included.

A player reads out at least one of the above (a) through (c) identification information (IDs) from the disc, for example, and performs content utilization by processing conforming to a predetermined sequence, e.g., key generation or content decoding using the ID, or the like. Further, the player transmits the above each type of the identification information (IDs) to a server, and receives various additional contents and service data and the like from the server based on ID confirmation at the server.

Note that, instead of the above (a) through (c) recorded in the disc, (d) Device binding ID that is player associated identification information may be used. The device binding ID is recorded in memory within the player as player-specific identification information, and at the time of using a disc-stored content, obtaining the subsequent data from the server, using the subsequent data stored in a storage unit such as a hard disk of the player, or the like, the device binding ID is used at processing, for example, ID confirmation serving as the confirmation processing of the player, key generation, content decoding, and the like.

A content certificate (Content Cert) 223 for proving that the content 221 is an authorized content, i.e., an authorized content managed by the license management department (AACS LA) 230 is recorded in the disc 220. The content certificate 223 is issued under the management of the license management department 230 as data, corresponding to the content 221 recorded in the disc 220, for certifying validity thereof, and is recorded in the disc 220.

The content certificate 223 has a configuration, such as shown in the details thereof within the license management department 230 shown in FIG. 2, wherein a root certificate hash that is hash values generated from the configuration data of a root certificate is recorded, and an electronic signature by the secret key of the license management department (AACS LA) 230 is provided to these recorded hash values.

Also, a root certificate (BD-J Root Cert) 224 to be recorded in the disc 220 has a data configuration, such as details thereof being shown in the content owner 210 shown in FIG. 2, including the public key of the content owner, and a signature generated from the secret key of the content owner as to the public key of the content owner, and is recorded in the disc 220 as a certificate corresponding to a disc-recorded application 225 to be recorded in the disc 220.

The player which plays the content 221 recorded in the disc 220 executes verification of the signature set to the content certificate 223, confirms validity of the content certificate 223, and performs utilization of the content 221 with this validity confirmation as a condition. Thus, confirmation of validity is rigorously executed regarding contents.

Further, the disc-recorded application (BD-J application) 225 is recorded in the disc 220. This disc-recorded application 225 is, for example, an application for performing playback processing or copy processing of the content 221, other processing, e.g., for receiving service data from an external server, or the like. The disc-recorded application 225 has a configuration, such as details thereof being shown in the content owner 210 shown in FIG. 2, wherein a signature is set to an application that the content owner provides using the secret key of the content owner.

This disc-recorded application 225 is not capable of directly executing readout of the identification information 222 recorded in the disc 220, and accordingly requests readout of the identification information (IDs) 222 from another program, and receives the identification information (IDs) read out from the disc by the other program.

Description will be made regarding a readout processing example of the identification information (IDs) 222 recorded in the disc 220, with reference to FIG. 3. The disc-recorded application 225 is executed at an application executing unit 301 of a player 300. The disc-recorded application 225 is, for example, a Java (registered trademark) program, and in this case, the application executing unit 301 is configured of, for example, a virtual machine (referred to as BD-J Virtual Machine) which executes the Java (registered trademark) program.

An application to be executed at the application executing unit 301 is not capable of directly executing readout of the identification information 222 recorded in the disc 220, and accordingly requests readout of the IDs from a program that executes readout of the identification information 222. The AACS layer (ID information obtaining program executing unit) 302 shown in FIG. 3 directly executes readout of the identification information 222 recorded in the disc 220. The AACS layer 302 is a data processing unit which executes data processing conforming to a sequence in accordance with the AACS rule.

The application that the application executing unit 301 executes performs call-up of an API (Application Programming Interface) as to the AACS layer (ID information obtaining program executing unit) 302. This API is an API made up of a function for allowing an application to perform readout of the identification information 222 recorded in the disc 220.

The AACS layer (ID information obtaining program executing unit) 302 executes readout of the identification information 222 recorded in the disc 220 in response to the API call-up from the application executing unit 301, and provides the readout identification information 222 to the application executing unit 301. Subsequently, the application that is being executed at the application executing unit 301 performs utilization of a content, or obtaining of service data using the obtained identification information, e.g., processing for transmitting the obtained identification information (IDs) to a server to receive content copy permission information, or other service information, or the like.

Note that, with the present embodiment, an example using the identification information 222 recorded in the disc will be described, but as described above, a device binding ID that is player associated identification information may be used. A device binding ID is recorded in memory within the player as player-specific identification information, and at the time of using a disc-stored content, obtaining the subsequent data from the server, using the subsequent data stored in a storage unit such as a hard disk of the player, or the like, the device binding ID is used at processing, e.g., ID confirmation serving as the confirmation processing of the player, key generation, content decoding, and the like. An example will be described below wherein the identification information 222 recorded in the disc is used, but even in the event that a device binding ID that is playback associated identification information is read out from the memory of the player and used, this processing is executed as the same processing as later-described readout processing of the identification information 222.

A controversial point with the readout and utilization processing of the identification information is in that, as described above, the application to be executed at the application executing unit 301, i.e., the disc-recorded application 225 may be an unauthorized program. For example, the disc-recorded application 225 may be an unauthorized program generated so as to obtain the identification information 222 in an unauthorized manner.

Therefore, with the configuration of the present invention, in order to prevent such unauthorized processing, an application certificate (AACS On-line Cert) 251, and a root certificate associated signature data (AACS On-line Sig) 252 are further recorded in the disc 220.

The application certificate (AACS On-line Cert) 251 is a certificate issued by a certificate authority (BD-CA) 240, and has a configuration where signature data by the secret key of the certificate authority (BDA-CA) 240 is set as to the public key of a content owner.

The root certificate associated signature data (AACS On-line Sig) 252 is signature data generated by a content owner 210, and is signature data generated by applying the secret key of the content owner to data including the root certificate 224.

Figure 4:
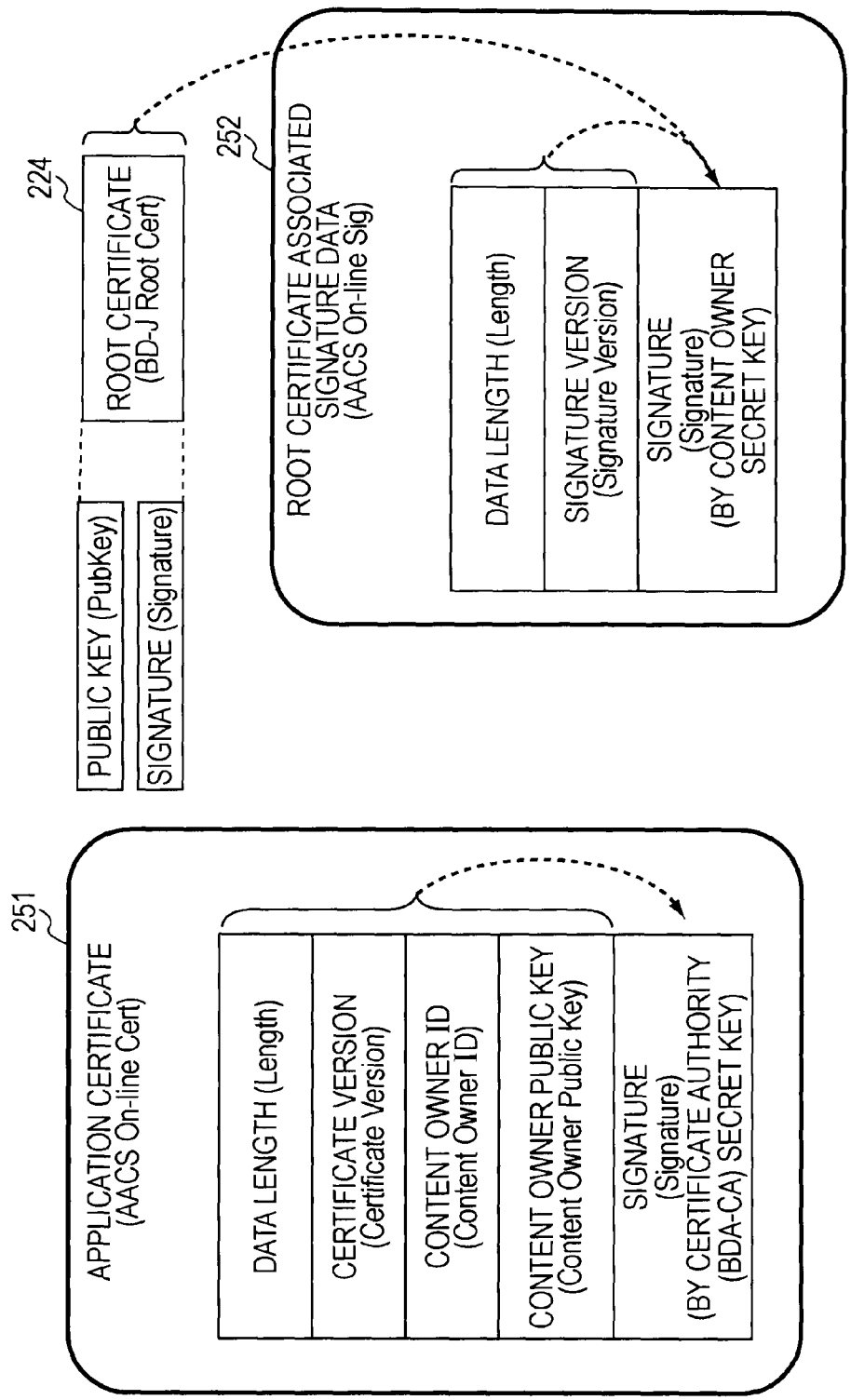
FIG. 4 is a diagram for describing a data configuration example of each of an application certificate (AACS On-line Cert) and root certificate associated signature data (AACS On-line Sig).

Description will be made regarding a data configuration example of each of the application certificate (AACS On-line Cert) 251 and the root certificate associated signature data (AACS On-line Sig) 252, with reference to FIG. 4.

The application certificate (AACS On-line Cert) 251 has, for example, the following data configuration, made up of the following data;

Data length: the data length of the whole data of an application certificate (four bytes), Certificate version: the version information of the application certificate (four bytes), Content owner ID: the identifier of a content owner who provides a disc-recorded application (4B), Content owner's public key: the public key of a content owner who provides a disc-recorded application, and Signature: the signature as to the application certificate generated by applying the secret key of the certificate authority (BDA-CA).

Note that the signature is a signature to be generated as to the configuration data of the application certificate 251 (the data length through the content owner's public key), and according to signature verification applying the public key of the certificate authority (BDA-CA), confirmation can be made whether or not the application certificate 251 has been tampered.

On the other hand, the root certificate associated signature data (AACS On-line Sig) 255 has, such as shown in the drawing, Data length: the data length of the whole data of root certificate associated signature data (four bytes), Signature version: the version information of the root certificate associated signature data (four bytes), and Signature: the signature as to the configuration data (data length, signature version) of the root certificate 224 and the root certificate associated signature data 252 generated by applying the secret key of the content owner who provides the disc-recorded application.

Note that the signature is a signature to be generated as to the configuration data (data length, signature version) of the root certificate 224 and the root certificate associated signature data 252, and according to signature verification applying the public key of the content owner, confirmation can be made whether or not the root certificate 224 and the root certificate associated signature data 252 have been tampered.

The issuance configuration of the application certificate 251 and the root certificate associated signature data 252 will be described with reference to FIG. 5.

Figure 5:
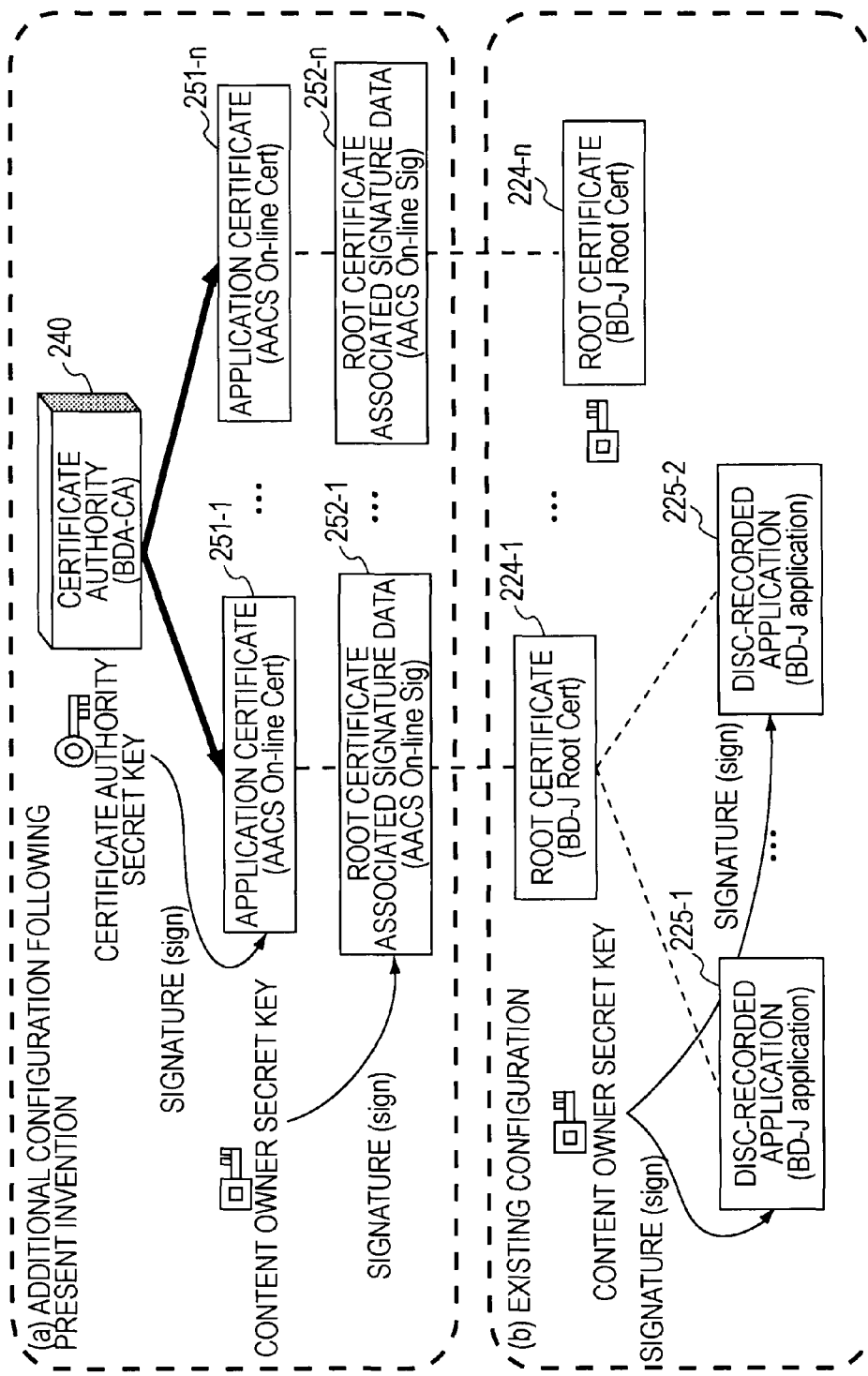
FIG. 5 is a diagram for describing the issuance configurations of the application certificate and the root certificate associated signature data.

FIG. 5 illustrates the configuration of (a) and (b) which are (a) Additional configuration following the present invention, and (b) Existing configuration.

Figure 2:
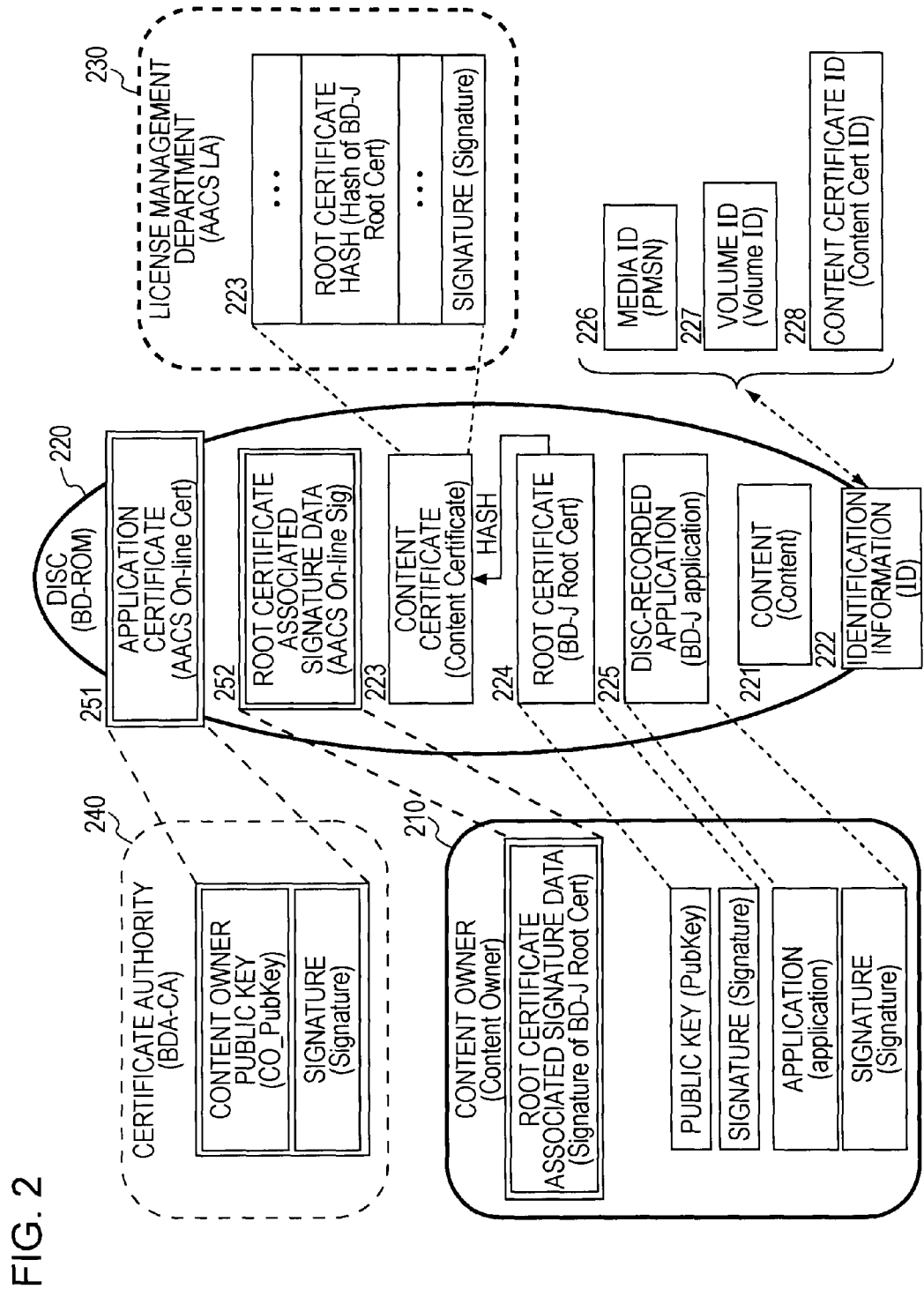
FIG. 2 is a diagram for describing a configuration for realizing application utilization control according to an embodiment of the present invention.

(b) Existing configuration is a configuration that commonly exists as to both of the configuration shown in FIG. 1 described as a conventional configuration, and the configuration shown in FIG. 2 described as the configuration of the present invention, i.e., the configuration of the disc-recorded application 225 and the root certificate 224 recorded in the disc.

A signature obtained by applying the secret key of the content owner who provides the disc-recorded application 225 is set to the disc-recorded application 225.

The root certificate 224 has, such as described with reference to FIG. 2, a configuration wherein a signature is set to the public key of the content owner who provides the disc-recorded application 225 using the secret key of the content owner.

This configuration is a configuration which is commonly included in both of the configuration shown in FIG. 1 described as a conventional configuration and the configuration shown in FIG. 2 described as the configuration according to the present invention.

On the other hand, (a) the additional configuration conforming to the present invention shown in the upper stage in FIG. 5 is an additional configuration which is not included in the configuration shown in FIG. 1 described as a conventional configuration, and only in the configuration shown in FIG. 2 described as the configuration according to the present invention.

First, the root certificate associated signature data (AACS On-line Sig) 252 is signature data that the content owner 210 generates, and is signature data to be generated by applying the secret key of the content owner to data including the root certificate 224. Executing verification as to the signature set to the root certificate associated signature data (AACS On-line Sig) 252 enables tampering verification of the root certificate 224 and the root certificate associated signature data 252 to be performed.

The application certificate (AACS On-line Cert) 251 is a certificate that the certificate authority (BDA-CA) 240 issues, and has a configuration wherein signature data according to the secret key of the certificate authority (BDA-CA) 240 is set to the public key of the content owner. According to this signature verification, the tampering verification of the application certificate 251 can be performed, and it can be confirmed that the content owner's public key stored in the application certificate 251 is authorized key data.

In the case that confirmation is made by tampering verification that the application certificate 251 is tampering-free authorized data, verification of the signature set to the root certificate associated signature data (AACS On-line Sig) 252 is performed by obtaining the content owner's public key stored in the application certificate 251 to apply the obtained content owner's public key. According to this signature verification, it is confirmed that the root certificate 224 and the root certificate associated signature data 252 is tampering-free authorized data.

Further, verification of the signature set to the disc-recorded application 225 is performed by the content owner's public key, and accordingly, tampering verification of the disc-recorded application 225 is performed.

According to such a sequence, such as shown in FIG. 5, the configuration and data of "certificate authority 240", "application certificate (AACS On-line Cert) 251", "root certificate associated signature data (AACS On-line Sig) 252", and "disc-recorded application (BD-J application 225" have a series of relationships.

The player which attempts to execute the disc-recorded application 225 that the content owner provides executes verification of the signatures set to the above-mentioned data, i.e., "application certificate (AACS On-line Cert) 251", and "root certificate associated signature data (AACS On-line Sig) 252".

Figure 3:
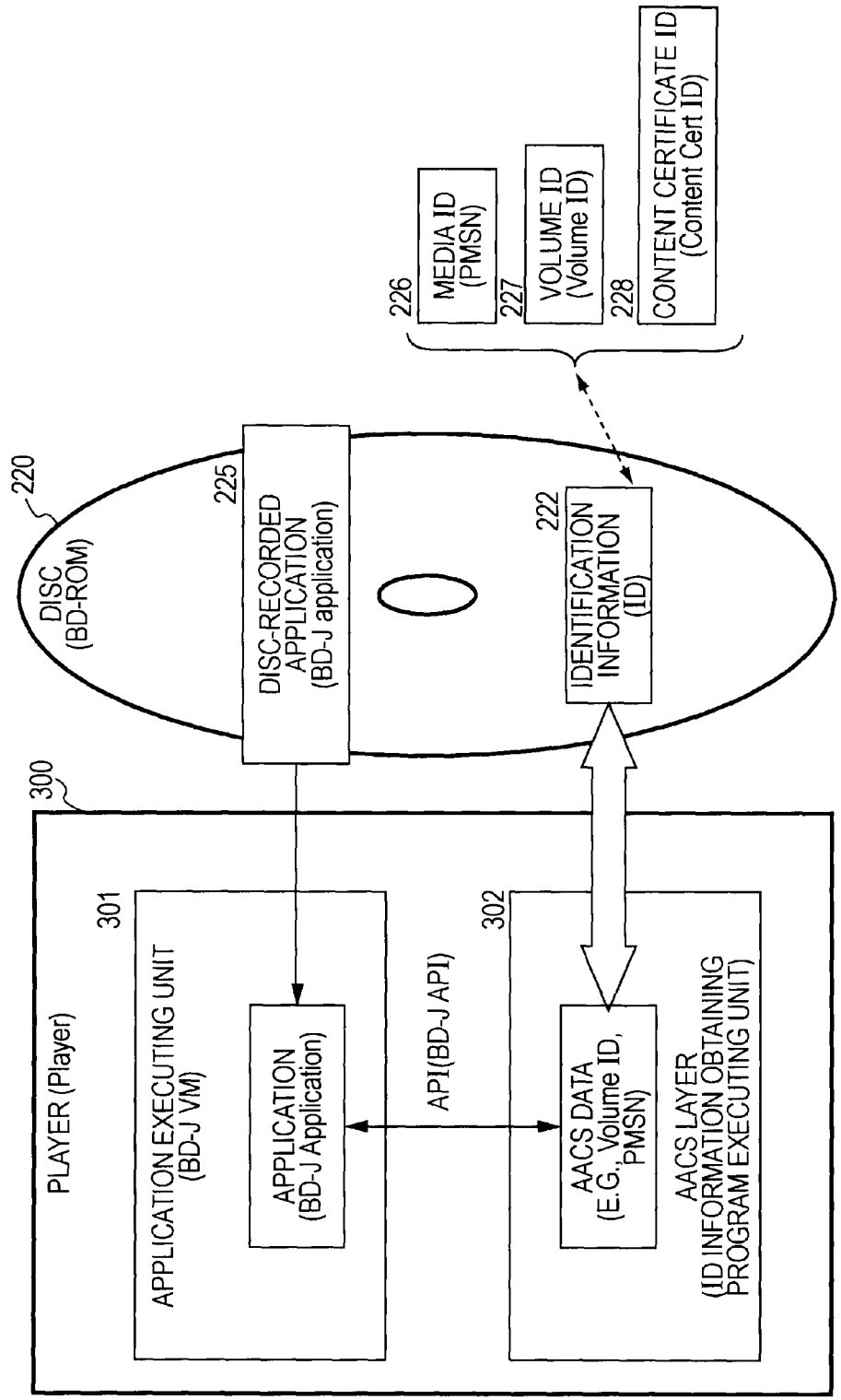
FIG. 3 is a diagram for describing a readout processing example of identification information (IDs) recorded in a disc.

In the case that it has been confirmed by this signature verification that the application certificate 251, the root certificate associated signature data 252, and the root certificate 224 have no tampering, execution of the disc-recorded application 225 is permitted, e.g., obtaining of the identification information 222 recorded in a disc conforming to the sequence described with reference to FIG. 3 is permitted. However, in the case that it has not been confirmed by this signature verification that the application certificate 251, the root certificate associated signature data 252, and the root certificate 224 have no tampering, execution of the disc-recorded application 225 is set so as not to be permitted.

Alternatively, processing such as stopping a part of the execution functions of the disc-recorded application 225 is performed. Specifically, control for disabling obtaining of the identification information 222, and processing using the identification information 222, control for disabling network connection, control for disabling copying of contents, or the like is performed. Note that, in the case that obtaining of the identification information 222 is set so as not to be permitted, this can be realized by the processing for prohibiting use of an API described above with reference to FIG. 3.

The processing sequence to be executed at the data processing unit of the player will be described with reference to the flowchart shown in FIG. 6.

First, in step S101 the data processing unit reads out an application certificate (AACS On-line Cert) from a disc, and performs verification of the signature set to the application certificate (AACS On-line Cert). In step S102, the data processing unit determines whether or not the signature verification of the application certificate has succeeded, i.e., whether or not confirmation has been made by the signature verification that the application certificate is a tampering-free authorized certificate.

Such as described above with reference to FIG. 4 and the like, the application certificate (AACS On-line Cert) is a certificate issued by the certificate authority (BDA-CA), and has a configuration wherein signature data according to the secret key of the certificate authority (BDA-CA) is set to a content owner's public key. According to this signature verification, verification can be performed regarding whether or not the application certificate has tampering, e.g., confirmation can be made whether or not the content owner's public key stored in the application certificate is authorized key data.

In the case that determination is made in step S102 that the signature verification of the application certificate has failed, i.e., confirmation has not been made that the application certificate is a tampering-free authorized certificate, the data processing unit proceeds to step S112. In step S112, the data processing unit performs prohibition or restriction of use of the disc-recorded application recorded in the disc. Specifically, the data processing unit performs, for example, application utilization restricting processing according to one of or a combination of (1) through (5) for example, which are (1) Restriction of available APIs of the disc-recorded application,
(2) Prohibition of network connection,
(3) Prohibition of playback of disc-recorded contents,
(4) Prohibition of copying of disc-recorded contents, and
(5) Prohibition of utilization of the disc-recorded application.

Subsequently, in step S113 the data processing unit performs application utilization processing in a permitted range.

On the other hand, in the case that confirmation is made in step S102 that the signature verification of the application certificate has succeeded, i.e., that the application certificate is a tampering-free authorized certificate, the data processing unit proceeds to step S103.

In step S103, the data processing unit reads out root certificate associated signature data (AACS On-line Sig) from the disc, and in step S104 performs signature verification of the root certificate associated signature data by applying the content owner's public key stored in the application certificate thereto. The key to be applied to this signature verification is the content owner's public key stored in the application certificate of which the validity has been confirmed in step S102.

Such as described above with reference to FIG. 4 and the like, the root certificate associated signature data is signature data that the content owner generates, and is signature data to be generated by applying the secret key of the content owner to data including the root certificate recorded in the disc. Executing verification of the signature set to the root certificate associated signature data (AACS On-line Sig) enables tampering verification of the root certificate and the root certificate associated signature data to be performed.

In step S105, the data processing unit determines whether or not the signature verification of the root certificate associated signature data has succeeded, i.e., whether or not confirmation has been made by the signature verification that the root certificate and the root certificate associated signature data are tampering-free authorized data. In the case that confirmation has not been made in step S105 that the root certificate and the root certificate associated signature data are tampering-free authorized data, the data processing unit proceeds to step S112. In step S112, the data processing unit performs prohibition or restriction of use of the disc-recorded application recorded in the disc. Specifically, such as described above, the data processing unit performs, for example, application utilization restricting processing according to one of or a combination of (1) through (5) for example, which are (1) Restriction of available APIs of the disc-recorded application,
(2) Prohibition of network connection,
(3) Prohibition of playback of disc-recorded contents,
(4) Prohibition of copying of disc-recorded contents, and
(5) Prohibition of utilization of the disc-recorded application.

Subsequently, in step S113 the data processing unit performs application utilization processing in a permitted range.

On the other hand, in the case that confirmation has been made in step S105 that the root certificate and the root certificate associated signature data are tampering-free authorized data, the data processing unit proceeds to step S106. In step S106, the data processing unit obtains a certificate revocation list (CRL) from a server or disc, and performs the signature verification processing of the obtained certificate revocation list (CRL).

The certificate revocation list (CRL) is a list in which information regarding an already revoked certificate of issued certificates is stored, e.g., a list indicating that the public key stored in a public key certificate, such as an application certificate or the like in which a public key is stored, is a revoked key, and a list where the certificate identifier of a revoked certificate, the identification information of the issuance destination of the certificate, and the like are registered. This certificate revocation list (CRL) is successively updated, and accordingly, the latest list is obtainable from a management server which is a certificate issuing entity, and also recorded in a disc and provided to a user. Note that version information is set to the certificate revocation list (CRL), and accordingly has a configuration whereby old and new distinction may be performed.

The signature according to the secret key of a certificate issuing entity is set to the certificate revocation list (CRL), which has a data configuration whereby tampering verification can be performed by the signature verification according to the public key of the certificate issuing entity. In step S106, the data processing unit performs the signature verification of the certificate revocation list (CRL). In the case that the signature verification of the certificate revocation list (CRL) has failed in step S107, this CRL may be an unauthorized CRL, and accordingly, the data processing unit returns to step S106, where the data processing unit obtains a new certificate revocation list (CRL) from the server, and performs signature verification regarding the obtained certificate revocation list (CRL).

In the case that the signature of the certificate revocation list (CRL) has succeeded in step S107, and the validity of the certificate revocation list (CRL) has been confirmed, the data processing unit proceeds to step S108.

In step S108, the data processing unit compares the version of the certificate revocation list (CRL) stored in the memory of the player, and the version of the certificate revocation list (CRL) of which the signature verification has been executed, obtained from the server or disc, and in the event that determination is made that the certificate revocation list (CRL) of which the signature verification has been executed, obtained from the server or disc is newer than the certificate revocation list (CRL) stored in the player, in step S109 the data processing unit stores the certificate revocation list (CRL) of which the signature verification has been executed, obtained from the server or disc in the memory of the player.

In step S110, the data processing unit reads out a content owner ID from the application certificate, and collates this with the recorded data of the certificate revocation list (CRL) of which the signature verification has been executed.

In the case that determination is made in step S111 that the content owner ID recorded in the application certificate is not recorded in the CRL list, the data processing unit proceeds to step S113 to perform application utilization processing in a permitted range. In this case, basically unrestricted application utilization processing may be performed. That is to say, obtaining and utilization processing of the identification information described above with reference to FIG. 3, or the like, may be executed without restriction.

On the other hand, in the case that determination is made in step S111 that the content owner ID recorded in the application certificate is recorded in the CRL list, the data processing unit proceeds to step S112 to perform prohibition or restriction of use of the disc-recorded application recorded in the disc. Specifically, such as described above, the data processing unit performs, for example, application utilization restricting processing according to one of or a combination of (1) through (5) for example, which are (1) Restriction of available APIs of the disc-recorded application, (2) Prohibition of network connection, (3) Prohibition of playback of disc-recorded contents, (4) Prohibition of copying of disc-recorded contents, and (5) Prohibition of utilization of the disc-recorded application.

Subsequently, in step S113 the data processing unit performs application utilization processing in a permitted range.

Note that, at the time of application utilization, such as described above with reference to FIG. 2, confirmation is made that the signature of a content owner is set to the disc-recorded application 225, and signature verification succeeds by performing signature verification to which the content owner's public key is applied, i.e., the disc-recorded application 225 is tampering-free authorized application data, and application utilization is performed on condition that such confirmation has been made.

Figure 6:
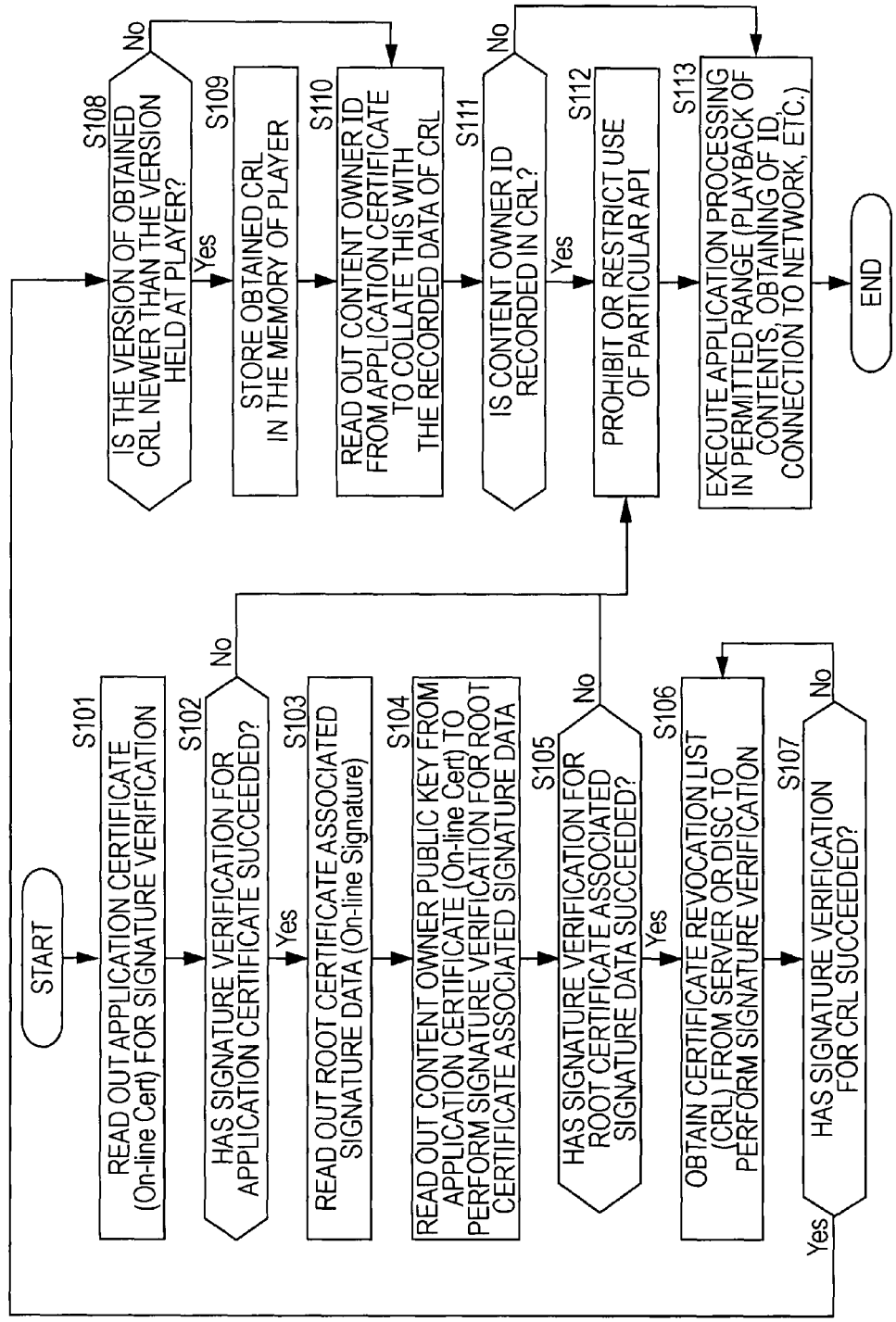
FIG. 6 is a diagram illustrating a flowchart for describing a processing sequence that a data processing unit of a player executes.

Thus, the configuration of the present invention enables, such as described above with reference to FIG. 5, the disc-recorded application that the content owner provides to be set in a manner correlated with "certificate authority 240", "application certificate (AACS On-line Cert) 251", "root certificate associated signature data (AACS On-line Sig) 252", and "disc-recorded application (BD-J application 225", these configuration and data, under the management of a third party, i.e., the certificate authority, allows the player which attempts to use the disc-recorded application to execute processing following the flow shown in FIG. 6 whereby rigorous validity confirmation of the disc-recorded application 225 can be performed. In the case that the signature verification of the application certificate (AACS On-line Cert) or the root certificate associated signature data (ARCS On-line Sig) has failed, application execution function restriction processing for stopping at least a part of the execution functions of the disc-recorded application 225 is performed.

Specifically, control for disabling obtaining or utilization processing of the identification information recorded in the disc such as a media ID (PMSN) or the like, control for disabling network connection, control for disabling copying of contents, or the like is performed.

Such as described above with reference to FIG. 3, processing such as readout of the identification information 222 recorded in the disc 220 is not performed by the disc-recorded application itself but by the AACS layer (ID information obtaining program executing unit) 302 shown in FIG. 3. As described above, the AACS layer executes data processing in accordance with the sequence conforming to the AACS rule.

Applications may request various types of processing from this AACS layer, and execute call-up of the API set according to the various types of processing. The AACS layer executes data processing according to the API call-up, e.g., the above-mentioned identification information readout processing or the like, and provides the processing results to the application executing unit.

Figure 7:
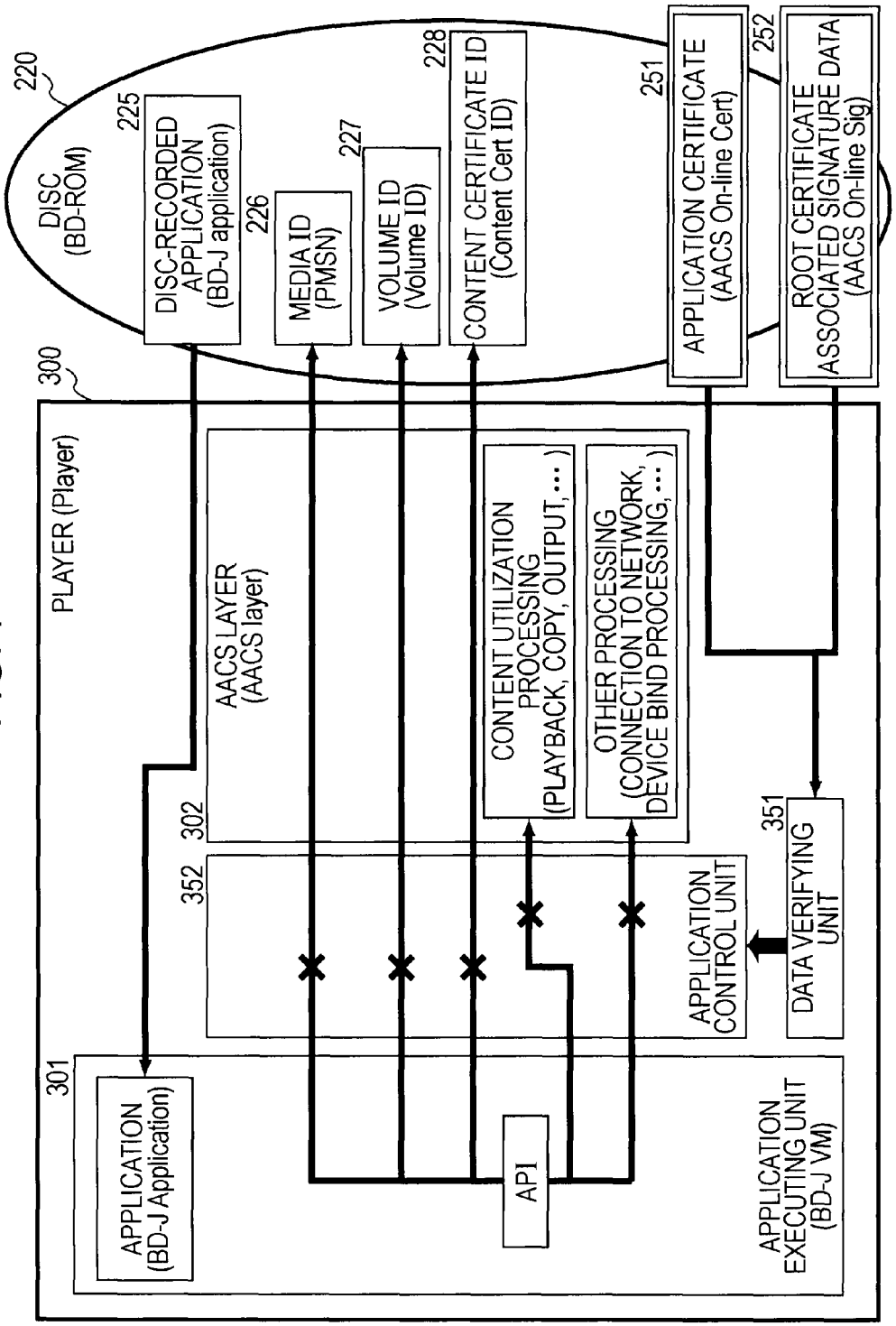
FIG. 7 is a diagram for describing a configuration example for controlling processing of an application.

As described with reference to FIG. 6, in the case that signature verification has failed regarding an application certificate (AACS On-line Cert) or a root certificate associated signature data (AACS On-line Sig) or the like, which are data recorded in a disc, the player according to the present invention is configured so as to restrict the processing of the application. A configuration example for controlling the processing of an application will be described with reference to FIG. 7. FIG. 7 illustrates the disc 220 and the player 300.

The player 300 includes an application executing unit 301, an AACS layer 302, and further a data verifying unit 351 and an application control unit 352. The application executing unit 301 and the AACS layer 302 correspond to the application executing unit 301 and the AACS layer 302 described with reference to FIG. 3.

The data verifying unit 351 executes processing in steps S101 through S110 of the flowchart shown in FIG. 6. Specifically, the data verifying unit 351 executes signature verification of the application certificate (AACS On-line Cert) 251, and the root certificate associated signature data (AACS On-line Sig) 252, which are data recorded in the disc, verification processing of the recorded data of the CRL, or the like, and notifies the application control unit 352 of the verification results thereof.

The application control unit 352 performs control of an application according to the data verification results at the data verifying unit 351. Specifically, as described above, for example, the application control unit 352 performs application utilization restricting processing according to one of or a combination of (1) through (5) for example, which are (1) Restriction of available APIs of the disc-recorded application, (2) Prohibition of network connection, (3) Prohibition of playback of disc-recorded contents, (4) Prohibition of copying of disc-recorded contents, and (5) Prohibition of utilization of the disc-recorded application.

The application executing unit 301 reads and executes the disc-recorded application (BD-J application) 225 recorded in the disc 220. The application performs call-up of an API made up of a function for causing the AACS layer 302 to execute various types of processing. However, the application control unit 352 controls this API processing according to the data verification results at the data verifying unit 351, and prohibits processing for inputting the API call-up to the AACS layer 302.

According to the API control by the application control unit 352, execution of various types of processing of an application is prohibited. Specifically, one processing or a plurality of processing of the above-mentioned (1) through (5) are prohibited. Note that the prohibiting processing or allowing processing at applications may be set variously.

The application executing unit 301 executes the API call-up according to the processing as to the AACS layer 302. Specifically, the application executing unit 301 executes a processing request using an API to be set according to various types of processing from the ARCS layer 302, such as API for allowing the AACS layer to execute the readout processing of the media ID (PMSN) 226, API for allowing the AACS layer to execute the readout processing of the volume ID 227, API for allowing the ARCS layer to execute the readout processing of the content certificate ID 228, and further, API for allowing the AACS layer to execute playback or copying of a disc-recorded content, and providing of allowable information for external output processing, and API for allowing the AACS layer to execute various types of processing such as network connection, playback according to binding processing between a disc-recorded content and a content stored in the storage unit (hard disk or flash memory or the like) of the player, and the like, or output of processing permitted information, but according to the API control by the application control unit 352, execution of various types of processing of an application may selectively be prohibited.

Note that, as described above, not only the identifier recorded in the disc but also the device binding ID that is player associated identification information recorded in memory of the player may be used, and this case is also executable as the same processing mode as with the utilization of the identifier recorded in the disc. The device binding ID is recorded in the memory within the player as the player-specific identification information, and is used for processing such as ID confirmation serving as player confirmation processing, key generation, content decoding, or the like, at the time of utilization of a disc-stored content, obtaining of the subsequent data from a server, utilization of the subsequent data stored in the storage unit such as the hard disk of the player or the like, or the like.

Thus, according to the configuration of the present invention, the public key of a content owner who provides an application to be recorded is stored in a disc, an application certificate (AACS On-line Cert) to which the signature of a certificate authority is set, and a root certificate associated signature data (AACS On-line Sig) wherein the signature of the content owner is set to data including a root certificate, are recorded in the disc, and the player which attempts to execute the application is allowed to perform signature verification of the application certificate (AACS On-line Cert) following the flow shown in FIG. 6 to confirm the validity of the application certificate (AACS On-line Cert), to obtain the content owner's public key from the application certificate of which the validity has been confirmed, to perform the signature verification of the root certificate associated signature data (AACS On-line Sig) by applying the obtained content owner's public key, and to perform the validity confirmation of the root certificate. In the event that these signature verifications have failed, prohibition or restriction of utilization of the application is performed.

According to this configuration, the application provided by the content owner is disposed under the management of the certificate authority that is a third party, and accordingly, spread of unauthorized applications, unauthorized obtaining and utilization of the identification information due to use of an unauthorized application, or unauthorized utilization of contents may be prevented.

Processing example to which the timestamp of the certificate revocation list (CRL) has been applied Next, an example will be described of a configuration wherein the expiry date of an application certificate (AACS On-line Cert) to be recorded in a disc, i.e., date information corresponding to the revocation date of a content owner who is a providing entity of an application to be recorded in the disc is recorded in the certificate revocation list (CRL) in which the revocation information of the application certificate (AACS On-line Cert) is stored, and further, a timestamp indicating the date information when a license management department (AACS-LA) generated a signature is also set to a content certificate that the license management department (AACS-LA) 230 shown in FIG. 2 issues.

The player which attempts to execute the disc-recorded application executes comparison between the two timestamps of (a) The timestamp of the content certificate, and (b) The timestamp of the certificate revocation list (CRL).

In the case that the timestamp of the content certificate is date data equal to or later than the timestamp of the certificate revocation list (CRL), prohibition or restriction of use of the disc-recorded application is performed.

In the case that the timestamp of the content certificate is date data prior to the timestamp of the certificate revocation list (CRL), neither prohibition nor restriction of use of the disc-recorded application is performed. However, in the case that the above-mentioned signature verification, i.e., the signature verification of the application certificate (AACS On-line Cert) and the root certificate associated signature data (AACS On-line Sig) has failed, prohibition or restriction of use of the disc-recorded application is performed.

Description will be made regarding the data configuration of the certificate revocation list (CRL) and the content certificate used with the present embodiment, and the outline of the processing at the player, with reference to FIG. 8.

Figure 8:
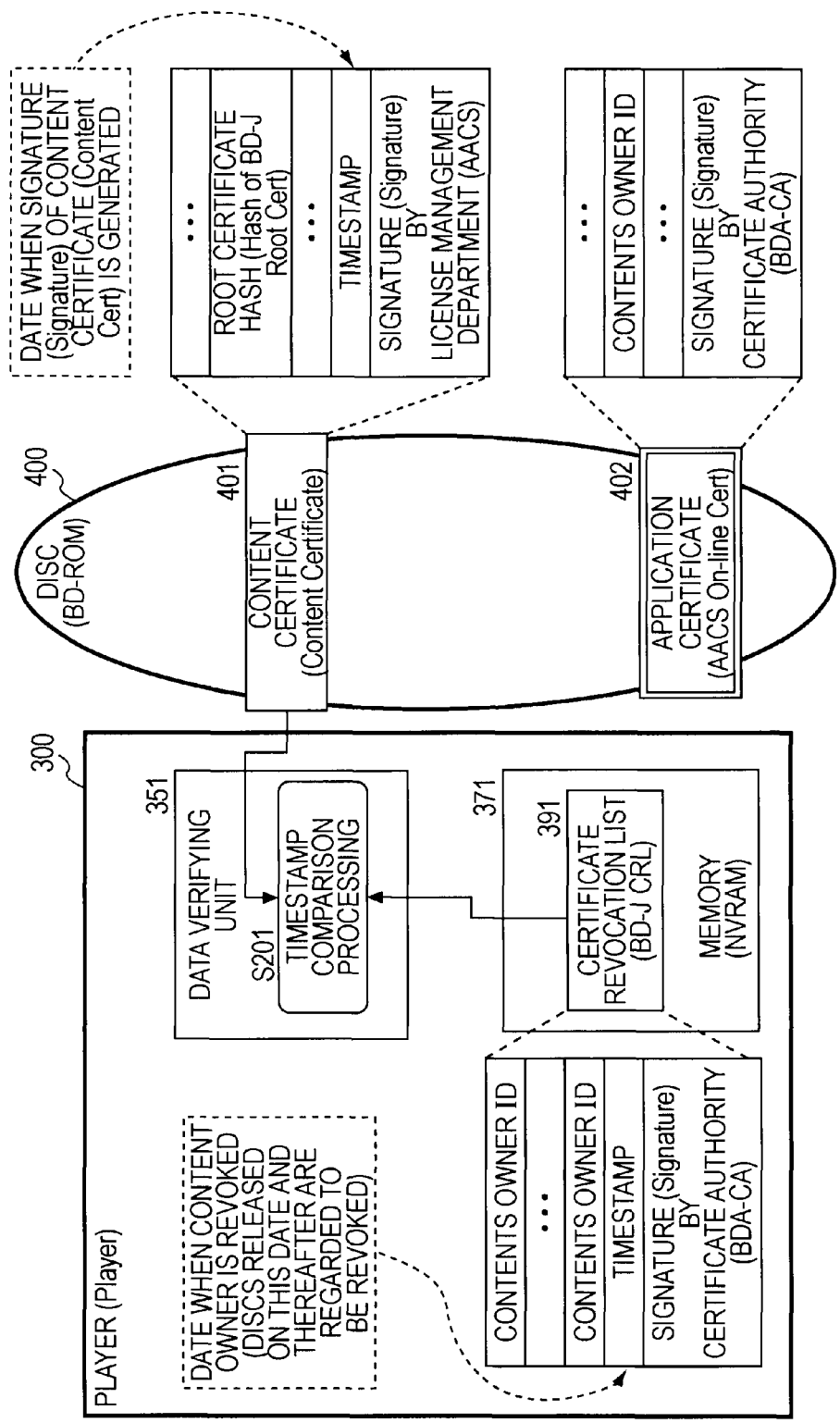
FIG. 8 is a diagram for describing a processing example employing a content certificate and a certificate revocation list (CRL) which include a timestamp.

FIG. 8 illustrates a disc 400 and a player 300. With the disc 400, only a content certificate 401 and an application certificate (AACS On-line Certificate) 402 are illustrated, but in addition to these, data such as the same content and identification information (IDs) as described above with reference to FIG. 2 and so forth is recorded therein.

The content certificate 401 is data for proving that a content to be recorded in a disc is an authorized content, i.e., an authorized content managed by the license management department (AACS LA), such as described above with reference to FIG. 2. The content certificate 401 is issued under the management of the license management department as data corresponding to a content to be recorded in the disc 400 for proving the validity thereof, and recorded in the disc 400.

With an example described above with reference to FIG. 2, the content certificate has a configuration wherein root certificate hash that is hash values generated by the configuration data of the root certificate is recorded, and an electronic signature according to the secret key of the license management department (ARCS LA) is added to the recorded hash values, but the content certificate 401 used for the present embodiment has a configuration wherein further a timestamp is used as recorded data, such as shown in FIG. 8.

This timestamp indicates date information when the license management department (AACS LA) generated a signature as to the content certificate 401, i.e., is equivalent to the issued date of the content certificate 401. Signing is executed as to data including the root certificate hash and timestamp included in the content certificate. Accordingly, if tampering of a timestamp is performed, signature verification will fail, and thus, it will be uncovered that tampering has been made.

On the other hand, the application certificate (AACS On-line Cert) 402 is shown in FIG. 8 in an abbreviated manner, but has the same configuration as described above with reference to FIG. 4, i.e., the following data configuration, and is a certificate recording the following data;

Data length: the data length of the whole data of an application certificate (four bytes), Certificate version: the version information of the application certificate (four bytes), Content owner ID: the identifier of a content owner who provides a disc-recorded application (4B), Content owner's public key: the public key of a content owner who provides a disc-recorded application, and Signature: the signature as to the application certificate generated by applying the secret key of the certificate authority (BDA-CA).

The player 300 obtains, such as described above with reference to the flow in FIG. 6, a certificate revocation list (CRL) 391 from the server or disc before executing the disc-recorded application, verifies whether or not the content owner ID recorded in the application certificate is included in the certificate revocation list (CRL), and in the case that the content owner ID is included, performs prohibition or restriction of use of the disc-recorded application.

With the present embodiment, a configuration is provided wherein a timestamp indicating the expiry date of the application certificate (AACS On-line Cert) 402, and the revocation date of the content owner recorded in the application certificate is set to the certificate revocation list (CRL) 391 in which the revocation information of the application certificate (AACS On-line Cert) 402 to be recorded in the disc is stored. That is to say, the certificate revocation list (CRL) 391 is a timestamp configured so that the date information corresponding to the revocation date of the content owner who is an application providing entity to be recorded in the disc is set thereto.

Note that the certificate revocation list (CRL) 391 is data to be successively updated, and such as described above with reference to the flow in FIG. 6, the player obtains a newer certificate revocation list (CRL) 391 from the disc or server, and stores the obtained certificate revocation list (CRL) 391 in the memory (NVRAM) 371 of the player 300 for later use.

In step S201 shown in FIG. 8, the data verifying unit 351 of the player 300 executes comparison between the two timestamps of (a) The timestamp of the content certificate, and (b) The timestamp of the certificate revocation list (CRL).

With this timestamp comparison processing, in the case that the timestamp of the content certificate is date data equal to or later than the timestamp of the certificate revocation list (CRL), the application control unit of the player performs prohibition or restriction of use of the disc-recorded application.

In the case that the timestamp of the content certificate is date data prior to the timestamp of the certificate revocation list (CRL), neither prohibition nor restriction of use of the disc-recorded application is performed. However, in the case that the above-mentioned signature verification, i.e., the signature verification of the application certificate (AACS On-line Cert) and the root certificate associated signature data (AACS On-line Sig) has failed, prohibition or restriction of use of the disc-recorded application is performed.

The present embodiment is a processing example wherein settings have been made such that the revocation of a content owner, i.e., the revocation date of a disc-recorded application that a content owner provides is confirmed by the timestamp of the certificate revocation list (CRL) to be successively updated, utilization prohibition or utilization restriction is performed regarding an application in the disc in which a content certificate having a timestamp equal to or later than this revocation date is recorded, but with regard to an application in the disc in which a content certificate having a timestamp prior to this revocation date is recorded, in the case that signature verification of the application certificate or root certificate associated signature data has succeeded, neither prohibition nor restriction of use is performed.

Figure 9:
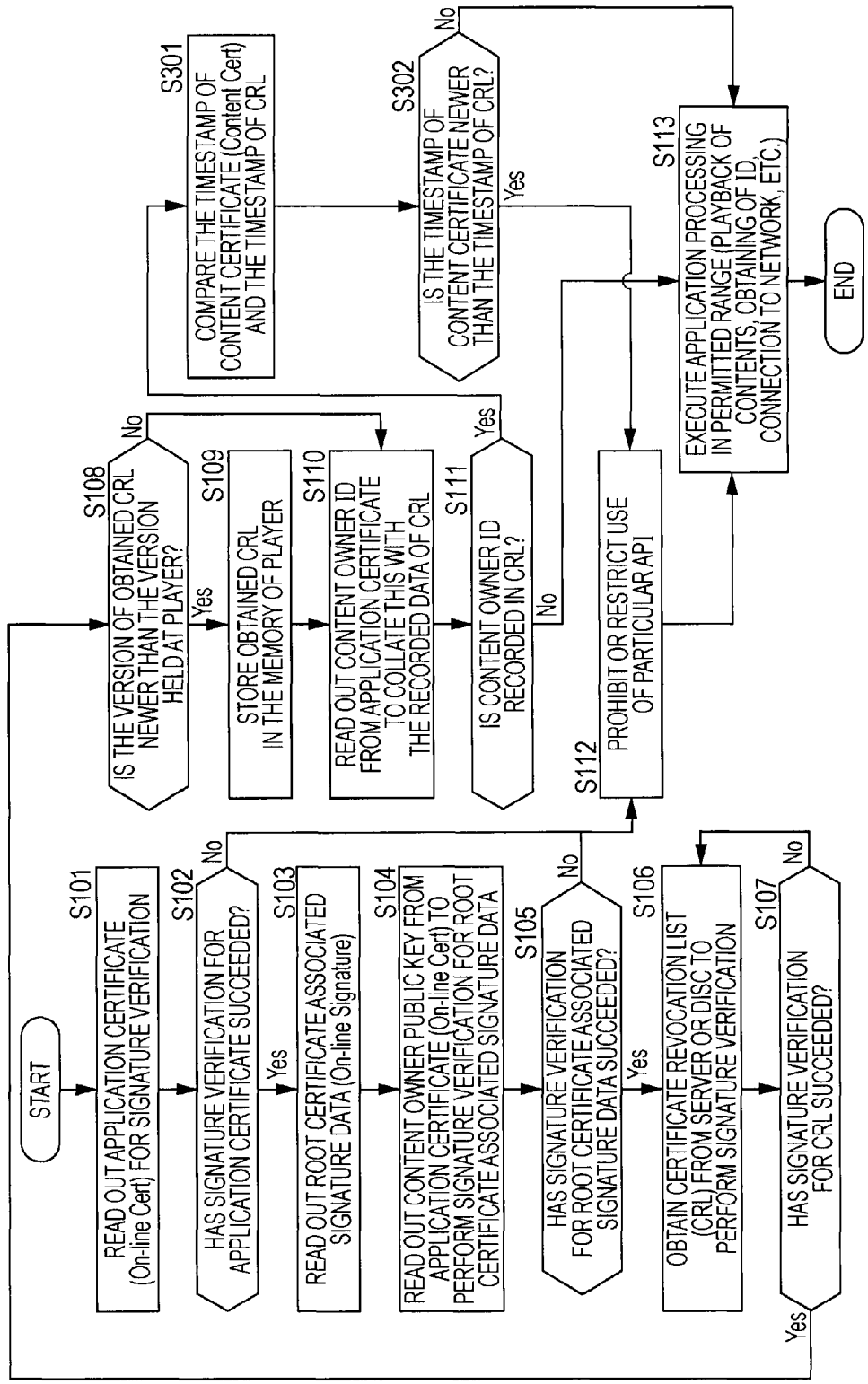
FIG. 9 is a diagram illustrating a flowchart for describing a processing sequence that a data processing unit of a player executes.

The processing sequence of the player corresponding to the present embodiment will be described with reference to the flowchart shown in FIG. 9. In the flowchart shown in FIG. 9, processing in steps S101 through S113 is the same steps as the processing described with reference to FIG. 6, and with the present embodiment, processing in step S301 and step S302 is newly added thereto.

The processing in each step will be described below. Note that the processing in steps S101 through S113 is the same steps as the processing described with reference to FIG. 6, and accordingly will be described in a simplified manner.

In step S101 an application certificate (AACS On-line Cert) is read out from a disc, and verification of the signature set to the application certificate (AACS On-line Cert) is performed.

In step S102, determination is made whether or not the signature verification of the application certificate has succeeded, i.e., whether or not confirmation has been made by the signature verification that the application certificate is a tampering-free authorized certificate.

In the case that determination is made in step S102 that the signature verification of the application certificate has failed, i.e., confirmation has not been made that the application certificate is a tampering-free authorized certificate, the processing proceeds to step S112. In step S112, prohibition or restriction of use of the disc-recorded application recorded in the disc is performed. Specifically, for example, application utilization restricting processing is performed according to one of or a combination of (1) through (5) for example, which are (1) Restriction of available APIs of the disc-recorded application, (2) Prohibition of network connection, (3) Prohibition of playback of disc-recorded contents, (4) Prohibition of copying of disc-recorded contents, and (5) Prohibition of utilization of the disc-recorded application.

Subsequently, in step S113 application utilization processing is performed in a permitted range.

On the other hand, in the case that confirmation is made in step S102 that the signature verification of the application certificate has succeeded, i.e., that the application certificate is a tampering-free authorized certificate, the processing proceeds to step S103.

In step S103, root certificate associated signature data (AACS On-line Sig) is read out from the disc, and in step S104 signature verification of the root certificate associated signature data is performed by applying the content owner's public key stored in the application certificate thereto. The key to be applied to this signature verification is the content owner's public key stored in the application certificate of which the validity has been confirmed in step S102.

In the case that, in step S105, the signature verification of the root certificate associated signature data has failed, and confirmation is not made that the root certificate and root certificate associated signature data are tampering-free authorized data, the processing proceeds to step S112. In step S112, prohibition or restriction of use of the disc-recorded application recorded in the disc is performed. Specifically, as described above for example, application utilization restricting processing is performed according to one of or a combination of (1) through (5) for example, which are (1) Restriction of available APIs of the disc-recorded application,
(2) Prohibition of network connection,
(3) Prohibition of playback of disc-recorded contents,
(4) Prohibition of copying of disc-recorded contents, and
(5) Prohibition of utilization of the disc-recorded application.

Subsequently, in step S113 application utilization processing is performed in a permitted range.

On the other hand, in the case that confirmation has been made in step S105 that the root certificate and the root certificate associated signature data are tampering-free authorized data, the processing proceeds to step S106. In step S106, a certificate revocation list (CRL) is obtained from the server or disc, and the signature verification processing of the obtained certificate revocation list (CRL) is performed.

The certificate revocation list (CRL) is a list in which information regarding an already revoked certificate of issued certificates is stored, and with the present embodiment, has a configuration wherein a revoked content owner ID who provides a disc-recorded application, and a timestamp indicating the revoked date of the content owner, i.e., the revoked date of the disc-recorded application that the content owner provides are recorded. Note that version information is set to the certificate revocation list (CRL), and accordingly has a configuration whereby old and new distinction may be performed.

The signature according to the secret key of a certificate issuing entity is set to the certificate revocation list (CRL), which has a data configuration whereby tampering verification can be performed by the signature verification according to the public key of the certificate issuing entity. In step S106, signature verification of the certificate revocation list (CRL) is performed. In the case that the signature of the certificate revocation list (CRL) has failed in step S107, this CRL may be an unauthorized CRL, and accordingly, the processing returns to step S106, where a new certificate revocation list (CRL) is obtained from the server, and signature verification is performed regarding the obtained certificate revocation list (CRL).

In the case that the signature of the certificate revocation list (CRL) has succeeded in step S107, and the validity of the certificate revocation list (CRL) has been confirmed, the processing proceeds to step S108.

In step S108, the version of the certificate revocation list (CRL) stored in the memory of the player, and the version of the certificate revocation list (CRL) of which the signature verification has been executed, obtained from the server or disc, are compared, and in the event that determination is made that the certificate revocation list (CRL) of which the signature verification has been executed, obtained from the server or disc is newer than the certificate revocation list (CRL) stored in the player, in step S109 the certificate revocation list (CRL) of which the signature verification has been executed, obtained from the server or disc is stored in the memory of the player.

In step S110, a content owner ID is read out from the application certificate, and this is collated with the recorded data of the certificate revocation list (CRL) of which the signature verification has been executed.

In the case that determination is made in step S111 that the content owner ID recorded in the application certificate is not recorded in the CRL list, the processing proceeds to step S113, where application utilization processing is performed in a permitted range. In this case, basically, unrestricted application utilization processing may be performed. That is to say, obtaining and utilization processing of the identification information described above with reference to FIG. 3, or the like, may be executed without restriction.

On the other hand, in the case that determination is made in step S111 that the content owner ID recorded in the application certificate is recorded in the CRL list, the processing proceeds to step S301.

In step S301, the timestamp comparison processing described above with reference to FIG. 8 is executed. Specifically, comparison is executed between the two timestamps of (a) The timestamp of the content certificate, and
(b) The timestamp of the certificate revocation list (CRL).

In step S302, in the case that confirmation is made that the timestamp of the content certificate is date data equal to or later than the timestamp of the certificate revocation list (CRL), determination is made that the disc, or the application recorded in the disc is a disc manufactured after the content owner is revoked, or the recorded application, and the processing proceeds to step S112, where prohibition or restriction of use of the disc-recorded application recorded in the disc is performed. Specifically, as described above, for example, application utilization restricting processing is performed according to one of or a combination of (1) through (5) for example, which are (1) Restriction of available APIs of the disc-recorded application,
(2) Prohibition of network connection,
(3) Prohibition of playback of disc-recorded contents,
(4) Prohibition of copying of disc-recorded contents, and
(5) Prohibition of utilization of the disc-recorded application.

Subsequently, in step S113 application utilization processing is performed in a permitted range.

On the other hand, in the case that confirmation has been made in step S302 that the timestamp of the content certificate is date data prior to the timestamp of the certificate revocation list (CRL), determination is made that the disc, or the application recorded in the disc, is a disc manufactured before the content owner was revoked, or an application recorded in the disc, the processing proceeds to step S113 without performing prohibition or restriction of use of the disc-recorded application, where the application is determined to be usable.

Note that, such as described above with reference to FIG. 2, confirmation is made that the signature of a content owner is set to the disc-recorded application 225, signature verification is performed by applying the public key of the content owner, and that the signature verification has succeeded, i.e., the disc-recorded application 225 is tampering-free authorized application data, and application utilization is performed on condition that this confirmation has been made.

Thus, with the configuration of the present embodiment, the data verifying unit of the player 300 executes comparison between the two timestamps of (a) The timestamp of the content certificate, and (b) The timestamp of the certificate revocation list (CRL), and in the case that the timestamp of the content certificate is date data equal to or later than the timestamp of the certificate revocation list (CRL), the application control unit of the player performs prohibition or restriction of use of the disc-recorded application, and in the case that the timestamp of the content certificate is date data prior to the timestamp of the certificate revocation list (CRL), and in the event that the above-mentioned signature verification, i.e., the signature verification of the application certificate (AACS On-line Cert) or the root certificate associated signature data (AACS On-line Sig) has been succeeded, performs neither prohibition nor restriction of use of the disc-recorded application.

According to this configuration, an evil may be eliminated wherein utilization restriction is performed even regarding an application before the content owner thereof is revoked.

Description has been made so far in detail regarding the present invention with reference to a particular embodiment. However, it is clearly evident that one skilled in the art can perform correction or substitution of an embodiment without departing from the essence of the present invention. That is to say, the present invention has been disclosed in an exemplification mode, and the description content of the present specification is not to be interpreted in a limited manner. The claims should be referred to in order to determine the essence of the present invention.

The above-mentioned series of processing described in the Specification may be executed by hardware, software, or a compound configuration of both. In a case of executing the processing by software, a program in which the processing sequence is recorded may be executed by being installed to memory within a computer embedded in dedicated hardware, or may be executed by being installed to a general-purpose computer capable of executing various types of processing. For example, the program may be recorded in a recording medium beforehand. In addition to install the program to a computer from a recording medium, the program may be received via a network such as a LAN (Local Area Network) or the Internet and installed to a recording medium such as a built-in hard disk or the like.

Note that the various types of processing described in the Specification may not only be executed in time sequence in accordance with the described sequence but also be executed in parallel or individually according to the processing capacity of a device which executes the processing, or needs. Also, with the present Specification, system refers to a logical collection of multiple devices, and is not restricted to each configuration device being housed within the same casing.

Industrial Applicability

As described above, according to an embodiment of the present invention, a configuration is made wherein a certificate revocation list (CRL) in which the revoked information of a content owner, who is a providing entity of an application program recorded in a disc, is recorded, is referenced to verify whether or not a content owner identifier recorded in an application certificate is included in the certificate revocation list (CRL), and in the case that the content owner identifier is included, comparison between a timestamp stored in the content certificate, and the timestamp of the certificate revocation list (CRL) is executed, and in the case that the timestamp of the content certificate has date data equal to or later than the timestamp of the CRL, the utilization processing of the application at the application executing unit is prohibited or restricted. According to the present configuration, a configuration is realized wherein utilization restriction is not performed upon an unrevoked application, and is performed upon a revoked application alone.

The invention claimed is:

1. An information processing device configured to perform utilization control of an application program recorded in a disc, comprising:

an application executing unit configured to read the application program from the disc and to execute said application program;

a data verifying unit configured to read out, from the disc, an application certificate in which a public key of a content owner serving as a provider of said application program is stored, and in which a first signature of a certificate authority that is a third party is set, to execute first signature verification on the first signature only, and when the first signature verification succeeds, to read out, from the disc, root certificate associated data including a second signature as to data including a root certificate recorded in the disc as a certificate corresponding to said application program, to read out the public keg of the content owner from the application certificate, and to apply said content owner's public key thereto to the root certificate associated data to execute second signature verification, in the case that the signature verification of the root certificate associated data has succeeded, the data verifying unit performs a signature verification of a certificate revocation list (CRL), wherein, in the case that the signature of the certificate revocation list (CRL) has failed, the data verifying unit obtains a new certificate revocation list (CRL) from a server, and performs signature verification regarding the obtained certificate revocation list (CRL);

a memory storing the root certificate associated data; and an application control unit configured to prohibit or restrict execution of said application program by said application executing unit when verification fails at the first or second signature verification at said data verifying unit.

2. The information processing device according to claim 1 wherein said data verifying unit refers to a certificate revocation list (CRL) in which revocation information of a content owner who is a providing entity of said application program is recorded to verify whether or not a content owner identifier recorded in an application certificate recorded in the disc serving as a certificate corresponding to said application program is included in said certificate revocation list (CRL), and when said content owner identifier is included, obtains a content certificate timestamp stored in a content certificate recorded in the disc as a certificate corresponding to a recorded content of said disc, and a CRL timestamp stored in said certificate revocation list (CRL) to execute comparison of both timestamps, and wherein said application control unit prohibits or restricts application program utilization processing at said application executing unit, that when said content certificate timestamp has date data equal to or later than said CRL timestamp.

3. The information processing device according to claim 2, wherein said content certificate timestamp is date information corresponding to a signature generated date by a content certificate issuing entity, and wherein said CRL timestamp is an expiry date of said application certificate, which is date information corresponding to a revocation date of a content owner recorded in said application certificate.

4. The information processing device according to claim 1, wherein said application control unit executes is configured to execute processing for prohibiting said application executing unit from obtaining identification information recorded in the disc or in the information processing device.

5. The information processing device according to claim 4 wherein said identification information is one of identification information of (a) through (d) which are:
   (a) Media ID (PMSN) that is disc-specific identification information,
   (b) Volume ID to be set in increments of disc titles,
   (c) Content certificate ID serving as the identification information of a content certificate set corresponding to a disc recorded content, and
   (d) Device binding ID that is the identification information of an information processing device.

6. The information processing device according to claim 1, wherein said application control unit executes processing for prohibiting or restricting said application executing unit from executing playback, copy, or external output of a content recorded in the disc.

7. The information processing device according to claim 1, wherein said application control unit executes processing for prohibiting or restricting said application executing unit from executing API call-up processing as to a program executing unit configured to perform reading or utilization processing of disc recorded data.

8. The information processing device of claim 1, wherein the application control unit is configured to selectively prohibit processing of the application program, including at least one of restriction of available APIs of the application program, prohibition of a network connection, prohibition of playback of the disc-recorded contents, prohibition of copying of disc-recorded contents, and prohibition of utilization of disc-recorded applications.

9. The information processing device of claim 1, wherein the application control unit is configured to prohibit processing of an API for allowing execution of playback according to binding processing between disc-recorded content and content stored in the memory of the information processing device.

10. An information processing method causing an information processing device to perform utilization control of an application program recorded in a disc at an information processing device, comprising:
   reading out, from the disc, an application certificate in which a public key of a content owner serving as a provider of said application program is stored, and in which a first signature of a certificate authority that is a third party is set, to execute first signature verification, and reading out, from the disc, root certificate associated data including a second signature as to data including a root certificate recorded in the disc as a certificate corresponding to said application program, from a disc, and applying said content owner's public key thereto to execute second signature verification, in the case that the signature verification of the root certificate associated data has succeeded, performing a signature verification of a certificate revocation list (CRL), wherein, in the case that the signature of the certificate revocation list (CRL) has failed, obtaining a new certificate revocation list (CRL) from a server, and performing signature verification regarding the obtained certificate revocation list (CRL); and
   prohibiting or restricting an application control unit, utilization processing of said application program when verification fails at the first or second signature verification processing in said data verifying step.

11. The information processing method according to claim 10, further comprising:
   referring to a certificate revocation list (CRL) in which revocation information of a content owner who is a providing entity of said application program is recorded to verify whether or not a content owner identifier recorded in an application certificate recorded in the disc as a certificate corresponding to said application program is included in said certificate revocation list (CRL), and when said content owner identifier is included, obtaining a content certificate timestamp stored in a content certificate recorded in the disc as a certificate corresponding to a recorded content of said disc, and a CRL timestamp stored in said certificate revocation list (CRL) to execute comparison of both timestamps; and
   prohibiting or restricting utilization processing of said application program, when said content certificate timestamp has date data equal to or later than said CRL timestamp.

12. The information processing method according to claim 11, wherein said content certificate timestamp is date information corresponding to a signature generated date by a content certificate issuing entity, wherein said CRL timestamp is an expiry date of said application certificate, which is date information corresponding to a revocation date of a content owner recorded in said application certificate.

13. The information processing method according to claim 10, wherein said prohibiting step includes prohibiting, by the application control unit, said application from obtaining identification information recorded in the disc or in the information processing device.

14. The information processing method according to claim 13 wherein said identification information is one of identification information of (a) through (d) which are:
   (a) Media ID (PMSN) that is disc-specific identification information,
   (b) Volume ID to be set in increments of disc titles,
   (c) Content certificate ID serving as the identification information of a content certificate set corresponding to a disc recorded content, and
   (d) Device binding ID that is the identification information of an information processing device.

15. The information processing method according to claim 10, wherein said application control unit executes processing for prohibiting or restricting said application executing unit from executing playback, copy, or external output of a content recorded in the disc.

16. The information processing method according to claim 10, wherein said prohibiting step includes processing for prohibiting or restricting said application executing unit from executing API call-up processing as to a program executing unit configured to perform reading or utilization processing of disc recorded data.

17. A non-transitory computer-readable medium storing a program causing an information processing device to perform utilization control of an application program recorded in a disc, by performing steps comprising:
   reading out, from the disc, an application certificate in which a public key of a content owner serving as a provider of said application program is stored, and in which a first signature of a certificate authority that is a third party is set, to execute first signature verification, and reading out, from the disc, root certificate associated data including a second signature as to data including a root certificate recorded in the disc as a certificate corresponding to said application program, from a disc, and applying said content owner's public key thereto to execute second signature verification, in the case that the signature verification of the root certificate associated data has succeeded, performing a signature verification of a certificate revocation list (CRL), wherein, in the case that the signature of the certificate revocation list (CRL) has failed, obtaining a new certificate revocation list (CRL) from a server, and performs signature verification regarding the obtained certificate revocation list (CRL); and prohibiting or restricting, by an application control unit, said application program when verification fails at the first or second signature verification processing in said data verifying step.

* * * * *